United States Patent [19]

Hooton et al.

[11] 3,914,508

[45] Oct. 21, 1975

[54] COATING FOR PROTECTING A CARBON SUBSTRATE IN A MOIST OXIDATION ENVIRONMENT

[75] Inventors: Norris A. Hooton; Norman E. Jannasch, both of South Bend, Ind.

[73] Assignee: The Bendix Corporation, South Bend, Ind.

[22] Filed: Jan. 18, 1973

[21] Appl. No.: 324,624

Related U.S. Application Data

[63] Continuation-in-part of Ser. No. 123,403, March 11, 1971, abandoned.

[52] U.S. Cl. .............................................. 428/408
[51] Int. Cl. .............................................. C23c 1/00
[58] Field of Search.. 117/160 A, DIG. 10, DIG. 11, 117/46 CC, 228, 46 CA, 118; 188/251 M, 251 A, 251 R; 106/36; 51/298

[56] References Cited
UNITED STATES PATENTS

| | | | |
|---|---|---|---|
| 3,348,929 | 10/1967 | Valtscheu et al. | 117/228 |
| 3,356,525 | 12/1967 | Gutzeit | 117/119 |
| 3,672,936 | 6/1972 | Ehrenreich | 117/46 CC |
| 3,770,487 | 11/1973 | Gibson et al. | 117/46 CA |

*Primary Examiner*—Mayer Weinblatt
*Assistant Examiner*—Edith L. Rollins
*Attorney, Agent, or Firm*—Leo H. McCormick, Jr.; William N. Antonis

[57] ABSTRACT

A method of preventing oxidation of a carbon substrate in a moist environment by applying a coating to the surface of the substrate. Initially, the coating is a mixture of powders comprised of a carbonizable resin from 10–40% by weight, Boron or Boron compounds from 15–40% by weight and a modifier, preferably Chromium, from 10–70% by weight of the total mix. These powders are combined with a liquid carrier to form a slurry. A layer of this slurry is applied to the surface of the carbon substrate. The coated carbon substrate is then slowly heated to first remove the liquid carrier and later to cure the resin. After the resin is cured, the temperature is further raised in an inert atmosphere to carbonize the resin. When the resin is carbonized, a matrix bond is formed with the substrate for holding the Boron and modifier adjacent to the surface to be protected. Upon exposure of the coated surface of the carbon substrate to a high temperature, the Boron and the modifier mutually react with oxygen to form a water insoluble surface through which the penetration of oxygen is inhibited.

9 Claims, No Drawings

COATING FOR PROTECTING A CARBON SUBSTRATE IN A MOIST OXIDATION ENVIRONMENT

This application is a continuation-in-part of our parent application Ser. No. 123,403 filed March 11, 1971 now abandoned.

BACKGROUND OF THE INVENTION

The use of carbon materials has increased significantly in recent years because the high specific heat of such materials enables them to absorb greater quantities of heat for a given weight than more conventional metals such as copper and steel. However, at temperatures above 800°F. carbon begins to oxidize, and at temperatures near 2500°F. the loss of material due to oxidation is so rapid that the useful lifetime of articles made from such materials is measured in seconds or minutes.

In the past, various approaches have been tried to eliminate or reduce the oxidation of the carbon material. One approach involved a method of increasing the surface density of the carbon material by depositing a resin in the pores of the carbon material which is later charred to remove liquids while retaining the solids. By repeating this procedure several times, it is possible to fill the pores in the original carbon material to reduce oxygen penetration; another approach involved a method of applying a ceramic glaze to the surface of the carbon material which wets the surface and prevents oxygen penetration. In this instance, if the glaze does not properly adhere to the surface, it will crack and leave surface areas unprotected; and a third approach involved a method of incorporating oxidation resistant refractory elements as additives in the formation of the carbon material. However, the later approach usually results in a weight increase of the total system, and in the case of a friction material, such additives generally result in inferior friction properties. In addition to the shortcomings of an increase in weight, non-uniform coverage, and reduction in the coefficient of friction, which resulted from the methods of oxidation protection taught by the prior art, once a carbon material so protected is subjected to a moist environment or water bath an accelerated degeneration of the oxidation protection frequently results.

SUMMARY OF THE INVENTION

In order to overcome the disadvantages of known prior art methods of reducing oxidation of a carbon substrate we have devised a method of coating a selected surface of the substrate with a water insoluble oxidation resistant mixture. Initially, the coating is a mixture of powders of a carbonizable resin, Boron or Boron compound and a refractory metal, preferably Chromium, which are mixed with an organic solvent to form a slurry. The slurry is selectively applied to the carbon surface. The coated carbon substrate is first dried in an oven to remove the solvent, then heated to cure the resin and lastly the temperature increased sufficiently to char the resin to form a bonded matrix for holding the Boron or Boron compounds and refractory metal to the carbon substrate. If after receiving such a water insoluble coating the carbon substrate is subsequently subjected to a high temperature the Boron or Boron compound and the selected refractory metal mutually react with oxygen to form an oxide which flows over the coated surface and prevents penetration of oxygen.

It is therefore an object of this invention to provide a method and an article for reducing oxidation of a carbon material in a moist environment.

It is another object of this invention to provide a means of selectively applying a water insoluble oxidation coating to a carbon substrate.

It is still a further object of this invention to provide a carbon material with oxidation protection without appreciably increasing the unit weight of the carbon material.

It is still a further object of this invention to provide means for bonding a water insoluble oxidation coating to a surface of a carbon substrate.

These and other objects should become apparent from reading the specification.

DETAILED DESCRIPTION OF THE PREFERRED EMBODIMENT

The term carbon substrate when so used in this specification is to be construed or interpreted in the broad or generic sense as meaning not only the various commercial grades of carbon on the market, but also the various commercial forms or grades of partially or fully graphitized carbon or graphite commonly available. Carbon has been frequently referred to as amorphous or essentially non-crystalline whereas graphite is often looked upon as the common crystalline form of carbon. Diamond is a less common crystalline variety of carbon. However, it is generally recognized that there is no sharp or distinct dividing line, crystallographically speaking, between commercial grades of carbon and graphite, but there are various degrees of graphitization in carbon bodies depending on the methods of fabrication. For the purpose of this invention no distinction need be drawn between the two, and where reference is made to a carbon substrate, graphite is included, as pointed out above.

In many applications, the carbon substrate selected must be capable of repeatably being subjected to temperatures generated up to 2500°F., such as a carbon friction lining for use in a brake of an aircraft, without structural disintegration of exposed surfaces through oxidation in atmospheres where the relative humidity varies from 10% experienced in dry arid regions to 100% when submerged in water. To protect these exposed peripheral surfaces, a coating is applied to the carbon substrate rendering the area insoluble to water and impregnable to oxygen.

The coating invented by us is capable of being applied by the following process to all carbon substrates described above with the exception of the diamond. The coating, initially, is a dry mixture chosen from the following groups:

GROUP I

A powder selected from the group of carbonizable resins including (but not limited to): phenolics and furfuryl alcohol. The selected resin should comprise between 5 and 50 weight percentage of the dry powder mixture with the preferred range being between 10 to 40 weight per cent.

GROUP II

One or more powders selected from the group of materials which will form a protective surface on a carbon substrate when exposed to oxidizing atmospheres.

The preferred materials for this purpose include Boron, Boron Oxides, Boron Carbide, Boron Nitride, and other Boron containing compounds in which the element Boron comprises at least 25% of the compound weight. The selected Boron material should comprise from 10–60 weight percentage of the dry powder mixture, with the preferred range being between 15 and 40 weight per cent. (These weight percentages are based on the elemental Boron contribution only.) The selected Boron material will react with oxygen at high temperature exposure, forming an oxide which will flow over and seal the surface of the carbon substrate from oxygen.

GROUP III

One or more powders selected from the group of modifier materials consisting of Vanadium, Chromium, Niobium, Molybdenum, Tungsten, Tantalum, oxides of these elements and other compounds and alloys containing these elements in which the element comprises at least 50 per cent of the compound weight. The selected modifier material should comprise from 10–85 weight per cent of the dry mixture, with the preferred range being between 10 and 70 weight per cent. (These weight percentages are based on the metal element contribution only.) The selected modifier material reacting with oxygen and the selected Boron material form a compound which is water insoluble.

After selecting the desired weight percentages from Group I, Group II and Group II, the chosen dry powders are placed in a container and stirred together to insure uniform distribution of the components. An organic solvent, such as acetone, toluene, methyl-ethyl-ketone etc., is added to the dry mixture until a liquid mixture results. The liquidity of the mixture can vary from a paste to a slurry depending upon the method chosen in applying it to the carbon substrate. A first layer of the liquid composite is then applied, by any known process such as painting, spraying, plastering, etc., to the selected surface of the carbon substrate. The carbon substrate is placed in an oven or dryer, where the temperature is slowly raised driving off the liquid portion of the organic solvent. The coated carbon substrate is then placed in a chamber and the temperature is continually raised slowly to between 300° and 500° to cure the selected resin from Group I. The coated carbon substrate is then cooled and visually inspected for surface irregularities which may occur when drying and/or curing is too rapid. If cracks or pin holes are present, an additional layer of the liquid composite is placed on the first layer to assure that the entire selected surface is protected by a coating. The twice coated carbon substrate is again dried to remove the liquid portion in the additional layer of the composite mixture and further cured by slowly heating to 300° – 500°. At this stage, the resin in the coating on the selected portion of the carbon substrate is hard and the coating will resist normal handling treatment. After curing, the coated carbon substrate is placed in a non-oxidizing atmosphere, such as Nitrogen, Hydrogen, Argon, etc., and slowly raised in temperature to carbonize the resin. The carbonization or charring will take place between 1400° and 2000°F. depending upon the resin selected from Group I. The charred resin will provide a matrix integrally bonded to the surface of the carbon substrate for holding the selected Boron material from Group II and the refractory metal selected from Group III. The bond between the matrix and the surface of the substrate will be uneffected by fluctuations in temperature since the carbonized resin and the carbon substrate will have approximately the same coefficient of expansion. The coated surface can now be placed in a moist, oxidizing atmosphere without degradation since the Boron material selected from Group II above will prevent oxygen penetration and the refractory metal selected from Group III will render the coating water insoluble.

The following examples indicate typical conditions for testing the effectiveness of the coating on a carbon substrate used as a friction lining.

EXAMPLE 1

Two different coatings were mixed and applied by painting, in the manner previously described, to substrates of several fibered carbon composite specimens. The specimen sizes were approximately three-fourths inch square and one-fourth inch thick. One hole was drilled through each specimen to facilitate suspension in an oxidizing atmosphere. Coating A was compounded by mixing 22 weight per cent Phenolic Resin and 78 weight per cent Boron powder. Coating B was compounded by mixing 20 weight per cent Phenolic Resin, 60 weight per cent Boron powder, and 20 weight per cent Chromium powder. Both coatings used Acetone as the resin solvent.

Following the carbonization of the resin, part of the coated specimens and some uncoated substrate specimens, to establish a base comparison, were exposed to air in a furnace at a temperature of 1200°F. Table 1 summarizes the weight change in units of milligrams per square centimeter ($mg/cm^2$) based upon the initial weight and surface area of the specimens for varying periods of exposure time.

| Specimen | EXPOSURE TIME AT 1200°F. | | | |
| --- | --- | --- | --- | --- |
|  | ½ Hr. | 1 Hr. | 2 Hrs. | 5 Hrs. |
| Uncoated | −7.7 | −20.5 | −61.1 | −274.0 |
| Coating A | +9.4 | + 9.9 | +10.0 | + 9.2 |
| Coating B | +6.5 | + 6.7 | + 6.7 | + 6.3 |

To establish a protective range of the coating, when experiencing different thermal conditions part of the coated specimens and some uncoated specimens were exposed to air in a furnace at a temperature of 1800°F. Table 2 summarizes the weight change in units of milligrams per square centimeter ($mg/cm^2$) based upon the initial weight and surface area of the specimens for varying periods of exposure time.

TABLE 2

| Specimen | EXPOSURE TIME AT 1800°F. | | | |
| --- | --- | --- | --- | --- |
|  | ½ Hr. | 1 Hr. | 2 Hrs. | 5 Hrs. |
| Uncoated | −42.9 | −96.1 | −178.8 | * |
| Coating A | +11.3 | +12.0 | + 11.6 | + 0.8 |
| Coating B | +11.3 | +13.2 | + 15.1 | +16.7 |

*Specimen completely disintegrated

To determine the moisture resistance of the coating, part of the specimens with Coating A and Coating B were exposed to air for a period of 1 hour at 1600°F. This oxidation treatment was accompanied by a weight increase in the same manner reported in Tables 1 and 2 for the specimens protected by Coating A and Coating B. Following the oxidation treatment, the specimens were immersed in gently flowing water since this would be the extreme limit of a moist atmosphere, at room temperature for a period of 1½ hours. At the conclusion of this period, Coating A had been completely removed from the substrate, while over 40 weight per cent of Coating B remained.

As Example 1 illustrates, the presence of Chromium, acting in a manner as previously described, promotes substantial moisture resistance to the coating without impairing the oxidation resistant properties of same.

EXAMPLE 2

To determine a range of values for different weight percentages of selected components from Groups I, II & III, several other coating mixtures were applied to the same type substrate as employed in Example 1. They were then exposed to air at 1600°F. for 1 hour followed by immersion in gently flowing water at room temperature for 1½ hours. Table 3 summarizes the coating composition as dry mixed powders, weight change during oxidation, and per cent coating retained following the water treatment.

TABLE 3

| Specimen Coating | Coating Composition[1]- Wt. % | | | Oxidation[2] Wt. Change $(mg/cm^2)$ | Coating Retained After Water Soak %[3] |
|---|---|---|---|---|---|
| | Resin | Boron | Other | | |
| C | 5.6 | 10.3 | 84.1 Tungsten | + 7.8 | 25 |
| D | 9.3 | 17.0 | 73.7 Molybdenum | + 6.9 | 55 |
| E | 20.0 | 37.0 | 43.0 Chromium Oxide | + 4.5 | 45 |
| F | 10.5 | 22.0 | 67.5 Chromium | +14.5 | 86 |
| G | 45.0 | 45.0 | 10.0 Chromium | + 4.2 | 64 |
| H | 13.2 | 21.4 | 62.7 Vanadium | +12.3 | 35 |
| I | 10.7 | 19.5 | 69.8 Niobium | + 7.4 | 32 |
| J | 6.3 | 11.6 | 82.1 Tantalum | + 7.2 | 5 |

[1]Based on dry mixed powders.
[2]Exposure to air at 1600°F. for 1 hour.
[3]Immersed in gently stirred room temperature water for 1¼ hours - percentage based on weight loss.

These examples further illustrate the action of materials of Group III in imparting moisture resistance to the coating to protect the carbon substrates.

While the invention has been described in considerable detail, it is not to be limited to the particular examples above described; and it is our intention to cover hereby all novel adaptations, modifications and arrangements thereof which will occur to those skilled in the art.

We claim:

1. A carbon friction lining having a selected surface with a coating thereon for protecting an underlying carbon friction lining from oxidizing in a moist atmosphere at temperatures ranging from 1200° - 2500°F., said coating comprising:

a first material selected from the group consisting of Boron, Boron Oxides, Boron Carbides, Boron Nitride and other Boron compounds in which Boron comprises at least 25% of the compound weight, said selected material comprising from 10–60 weight per cent of the initial total coating;

a second material selected from the group consisting of Chromium, Vanadium, Molybdenum, Niobium, Tungsten, Tantalum, and oxides of these elements in which said elements comprise at least 50% of the oxides weight, said selected modifier material comprising from 10–85 weight per cent of the initial total coating; and a carbonizable resin comprising from 5–50 weight per cent of the initial total coating, said carbonizable resin forming a matrix bond with said carbon friction lining to hold the selected first material and the second material adjacent to the selected surface upon being charred up to a temperature of 2000°F. in a non-oxidizing atmosphere, said first and second selected materials reacting mutually with oxygen in an oxidizing atmosphere to form a water insoluble oxide surface through which the penetration of oxygen is inhibited.

2. The carbon friction lining as recited in claim 1 wherein the selected second material is Chromium added in the range of from 10–70 weight per cent of the initial total coating.

3. The carbon friction lining as recited in claim 2 wherein the selected first material is Boron added in the range of from 15–40 weight per cent of the initial total coating.

4. The carbon friction lining as recited in claim 1 wherein the selected first material is Boron added in the range of from 10–45 weight per cent of the initial total coating.

5. The carbon friction lining as recited in claim 4 wherein the selected second material is Tungsten added in the range of from 70–85 weight per cent of the initial total coating.

6. The carbon friction lining as recited in claim 4 wherein the selected second material is Molybdenum added in the range of from 65–80 weight per cent of the initial total coating.

7. The carbon friction lining as recited in claim 4 wherein the selected second material is Chromium Oxide added in the range of from 40–50 weight per cent of the initial total coating.

8. The carbon friction lining as recited in claim 4 wherein the selected second material is Tantalum added in the range of from 70–85 weight per cent of the initial total coating.

9. The carbon friction lining as recited in claim 4 wherein the selected second material is Chromium Oxide and alloys thereof added in the range of from 40–50 weight per cent of the initial total coating.

* * * * *